United States Patent
Lamberts et al.

(10) Patent No.: US 6,522,495 B1
(45) Date of Patent: Feb. 18, 2003

(54) SYSTEM, METHOD AND PROGRAM FOR DETERMINING THE MAGNETIC CENTER SHIFT WITHIN A DISK DRIVE SYSTEM

(75) Inventors: Bernd Lamberts, Cupertino, CA (US); Mantle Man-Hon Yu, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/293,230

(22) Filed: Apr. 16, 1999

(51) Int. Cl.$^7$ .................................................. G11B 5/596
(52) U.S. Cl. .................................. 360/77.04; 360/78.09
(58) Field of Search ........................... 360/77.08, 77.04, 360/39, 29, 65, 46, 25, 31; 702/191

(56) References Cited

U.S. PATENT DOCUMENTS

| | | |
|---|---|---|
| 4,575,776 A | 3/1986 | Stephens et al. |
| 4,885,516 A * | 12/1989 | El-Sadi ........................ 318/615 |
| 5,072,318 A | 12/1991 | Yu |
| 5,696,445 A | 12/1997 | Inbar |
| 5,776,537 A | 7/1998 | Ryan et al. |
| 5,793,559 A | 8/1998 | Shepherd et al. |
| 5,834,969 A | 11/1998 | Umeyama et al. |
| 5,844,742 A | 12/1998 | Yarmchuk et al. |
| 5,854,554 A | 12/1998 | Tomita et al. |
| 5,870,242 A | 2/1999 | Abe et al. |
| 5,909,661 A * | 6/1999 | Abramovitch et al. .................... 360/77.04 X |
| 5,930,067 A * | 7/1999 | Andrews et al. .......... 360/77.04 |
| 6,097,559 A * | 8/2000 | Ottesen et al. ................ 360/31 |

OTHER PUBLICATIONS

Kanu G. Ashar, "Magnetic Disk Drive Technology", 1997, Chapters 6 and 9.

* cited by examiner

Primary Examiner—David Hudspeth
Assistant Examiner—Kin Wong
(74) Attorney, Agent, or Firm—David W. Victor; Konrad Raynes Victor & Mann (57) ABSTRACT

In summary, preferred embodiments disclose a system, method, and program for determining a value for non-mechanical noise within a disk drive system. The non-mechanical noise is likely related to instability in a head which reads data from a magnetic surface within the disk drive system. First, a sample of position error signals (PES) indicating non-repeatable runouts (NRRO) is provided from read operations within the disk drive system. Spectral analysis is then performed on the provided samples to calculate non-filtered power values for the NRRO values at different frequencies. A filtered power spectrum is determined within a frequency range excluding mechanical noise. A filtered power value is calculated from the determined filtered power spectrum within the frequency range excluding mechanical noise. The calculated filtered power value may be compared against a predetermined value to determine whether to reject the disk drive system on the grounds that there is too much non-mechanical noise or noise related to instabilities and defects in the MR head.

38 Claims, 3 Drawing Sheets

SYSTEM, METHOD AND PROGRAM FOR DETERMINING THE MAGNETIC CENTER SHIFT WITHIN A DISK DRIVE SYSTEM

BACKGROUND OF THE INVENTION

1. Field of the Invention

The present invention relates to a method, system, and program for determining the magnetic center shift, or non-repeatable runout errors (NRRO), due to certain magnetic effects, absent mechanical noise.

2. Description of the Related Art

Computer hard disk drives include one or more disks of magnetic storage medium and a disk drive head assembly to read and write data on the magnetic storage medium. Magnoresistive (MR) heads typically include a write element comprised of a thin film inductive head and a read element comprised of a sensor. Manufacturers often test disk drives to determine whether error rates within the disk drive exceed a threshold of acceptability and, therefore, require rejection of the particular disk drive unit. Errors in the ability of an MR head to properly read data from the storage surface can be caused, in part, by track misregistration due to head positioning irregularities on a rotating disk, track interference, and head (magnetic) domain noises. Other causes of errors in disk drives are described in "Magnetic Disk Drive Technology: Heads, Media, Channel, Interfaces, and Integration," by Kanu G. Ashar (1997), which publication is incorporated herein by reference in its entirety.

In determining whether to accept or reject a disk drive, it is desirable to measure the magnetic center shift ("MCS") in the read head. MCS refers to the phenomena of instabilities in the read sensor that cause the read sensor to read an asymmetrical signal. An asymmetrical signal refers to the situation where the read sensor mistakenly reads the position as being more to the left or right of the track center than the actual position. The magnetic fields from the write sensor affect the resistivity of the MR read head thin film, which in turn results in the read sensor reading an asymmetrical position signal. Typically, a bias is applied to the MR head to attempt to compensate for asymmetries and obtain as much of a symmetric signal as possible, i.e., removing the tendency to improperly read a signal too far to the left or right of the track center. Notwithstanding attempts to bias the head to make the signal more symmetric, the MCS noise caused by the magnetic fields of the write head still cause the read sensor to deviate from the center of the track being read. Especially problematic is that MCS affects the ability of the read sensor to measure any signal accurately. Thus, MCS will produce feed forward errors when the read TMR is used to determine a corrective error signal in the closed loop servo system used in disk drives because the signal used in determining the read TMR would include asymmetries. There is thus a need to measure for MCS noise which may indicate structural defects in the MR head and produce additional undetected TMR.

Because the MCS effect is usually indicated by magnetic disturbances, it is in principal possible to measure the extent of MCS by measuring the TMR under presence and non-presence of a magnetic field. Because the magnetic field of concern is usually introduced by the write head, a conventional method compares the track misregistration (TMR) with the write head on with the TMR with the write head off. TMR occurs when the center of the read head is not positioned in the middle of the track during track following. The greater the read head is off-center, the greater the likelihood of errors and noise in reading and writing data from the storage surface of the disk. This increase in noise reduces the signal to noise ratio and the overall quality of data operations. TMR is measured by determining the probability of the read and write heads being a distance from the center of the track. The TMR is the standard deviation from the center or range around the center of the track at which the read head will be offset from the written track center most of the time. To measure the magnetic center shift, the TMR value for the read sensor is measured twice, once with the write head on and again with the write head off. The MCS is defined as the square root of the difference of the respective TMRs squared, as set forth in equation (1) below:

$$MCS = \sqrt{TMR_{Write}^2 - TMR_{Read}^2} \tag{1}$$

One problem with current techniques for measuring MCS, including the method of equation (1), is that a substantial amount of the measured TMR used to estimate MCS includes mechanical noise, such as noise resulting from thermal effects, spindle bearing runouts, mechanical vibrations, and servo loop electronic noise. Mechanical noise as defined herein does not include structural defects in the MR head or head instability. Thus, any measurement of MCS that is based on the TMR, and other current techniques, is often comprised substantially of mechanical noise unrelated to defects with the MR head. More accurate techniques for measuring the MCS resulting primarily from head instability are performed with precision testing equipment, which is typically expensive and requires significant set-up operations. However, such measurement apparatuses are used in the design process and cannot be used to test assembled disk drives. Although the TMR measurement technique may be performed on an assembled disk drive to estimate MCS, such TMR techniques often incorporate substantial mechanical noise. Further, an alterative approach which would involve enlarging the test scope and time to reduce the measurement noise would lead to increased manufacturing cost, which are undesired and impractical.

There, is thus a need to provide an expedient and reliable measurement of MCS on an assembled disk drive that is not dominated by measurements of mechanical noise to allow for a more accurate determination of whether to accept or reject a disk drive based on magnetic center shift.

SUMMARY OF THE PREFERRED EMBODIMENTS

To overcome the limitations in the prior art described above, preferred embodiments disclose a system, method, and program for determining a value for non-mechanical noise within a disk drive system. The non-mechanical noise is likely related to instability in a head which reads data from a magnetic surface within the disk drive system. First, a sample of position error signals (PES) indicating non-repeatable runouts (NRRO) is provided from read operations within the disk drive system. Spectral analysis is then performed on the provided samples to calculate non-filtered power values for the NRRO values at different frequencies. A filtered power spectrum is determined within a frequency range excluding mechanical noise components. A filtered power value is calculated from the determined filtered power spectrum within the frequency range excluding mechanical noise.

The calculated filtered power value may be compared against a predetermined value to determine whether to reject the disk drive system on the grounds that there is too much non-mechanical noise or noise related to external magnetic fields.

In further embodiments, the spectral analysis comprises a fourier analysis. In still further embodiments, the filtered power value is determined by first calculating the inverse of the fourier coefficients to determine the NRRO values that do not include mechanical noise. Second, the filtered power value is calculated by summing the product of the inverse of the fourier coefficients and the fourier coefficients between a range of values that exclude mechanical noise.

Preferred embodiments provide a method for estimating the magnetic center shift component of the NRRO signal, which is due to magnetic affects, particularly from the write head and structural defects in the thin film of the MR head. A power value is then calculated for this magnetic center shift using a discrete fourier transform. If the calculated power of the noise exceeds a predetermined threshold, then the disk file is rejected as having too much MCS noise. Preferred embodiments provide a method for determining magnetic center shift, i.e., MCS noise absent mechanical effects, after the disk drive has been assembled, using electronics within the disk drive and/or an external computer to which the disk drive is connected. After estimating the magnetic center shift for the disk drive, a determination can then be made on whether to reject or accept the tested disk drive.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
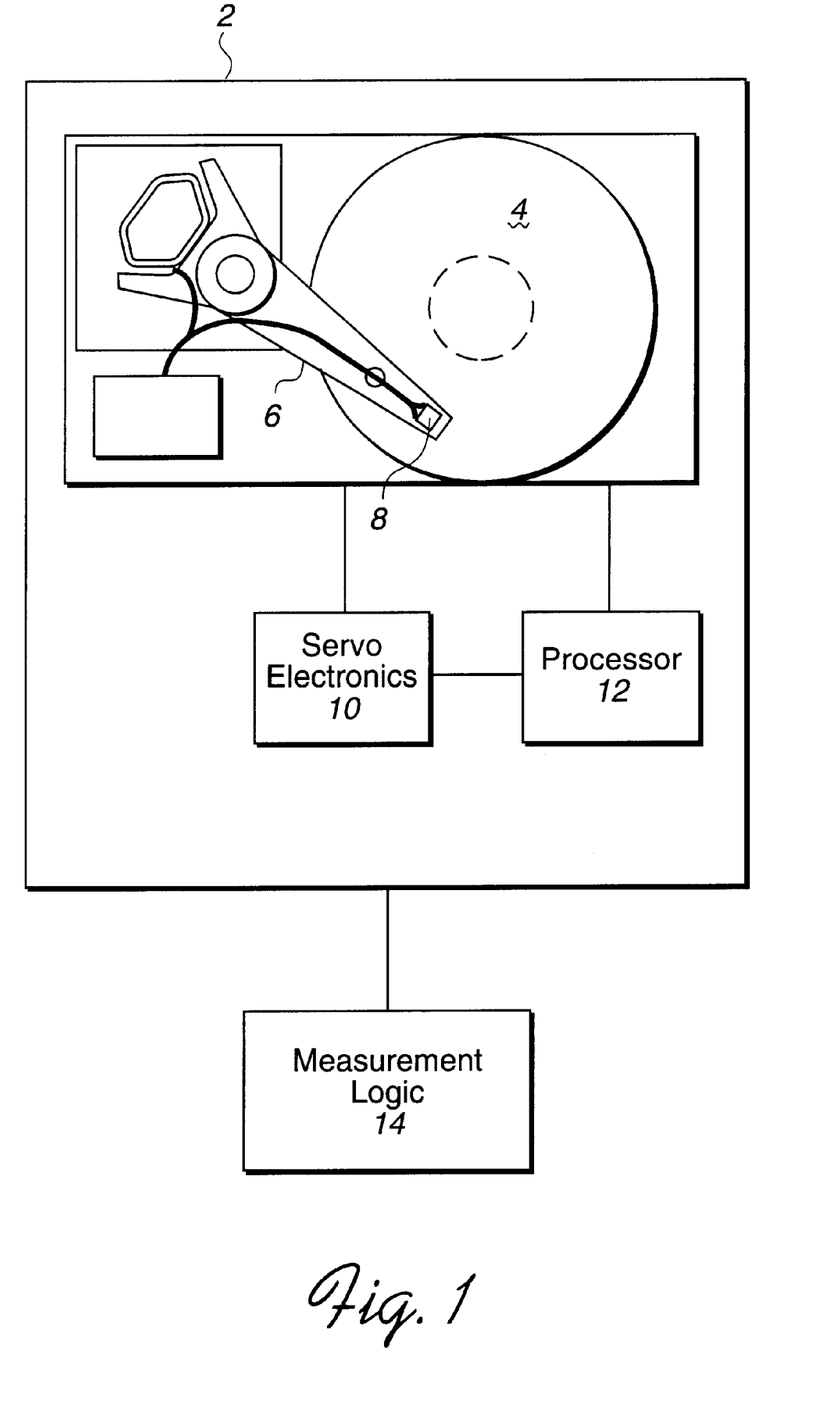
FIG. 1 is a block diagram illustrating a software and hardware environment in which preferred embodiments of the present invention are implemented.

FIG. 1 illustrates a disk drive system 2, including one or more rotating disks 4, an actuator assembly 6 to move a head assembly 8 across the disk 4 surface. The disk drive system 2 further includes servo electronics 10 and a processor 12. In preferred embodiments, the head is a magnetoresistive (MR) head device. However, in alternative embodiments, the head 8 may be constructed of other materials known in the art. The servo electronics 10 provides a closed loop feed back system to insure that data heads follow the tracks accurately and to control smooth transitions when the data head "seeks" from one track location to another track. The servo electronics 10 calculates the position error signal (PES) from the actual position data and from pre-recorded servo information either on a dedicated servo disk or on sectors interspersed among the data sectors on the disk. The servo electronics 10 uses the servo information to determine PES, which is the signal proportional to the difference between the ideal center line tracking and the actual positions of the head 8. The servo electronics 10 may then calculate a corrective position signal based on the PES. The processor 12 manages read/write operations and controls other disk operations. The processor 12 may perform certain of the operations to calculate PES, NRRO, and determine a corrective signal. The servo electronics 10 may calculate the PES and NRRO in manners known in the art. The commonly assigned patent, U.S. Pat. No. 5,072,318, entitled "Disk File With Adaptive Cancellation of NonRepeatable Disk Runout," which application is incorporated herein by reference in its entirety, describes a system for calculating NRRO using the servo control system within the disk drive.

In preferred embodiments, measurement logic 14 receives the NRRO data samples calculated by the servo electronics 10 and includes logic to filter mechanical noise from the NRRO signal to estimate the component of NRRO due to instability and defects in the head 8 structure in accordance with preferred embodiments. In preferred embodiments, the measurement logic 14 is implemented in a stand alone computer system in communication with the disk drive 2. In further embodiments, the measurement logic 14 to calculate a filtered NRRO signal may be implemented within electronics, such as processor 12, within the disk drive system 2. In such case, the disk drive system 2 would internally calculate a filtered NRRO signal in accordance with preferred embodiments, and store such information on the disk 4 or in another memory device for subsequent analysis. In alternative embodiments, the NRRO signal may be calculated using a servo-writing machine. In such case, the NRRO data would be filtered using logic implemented in the servo-writing device.

Figure 2:
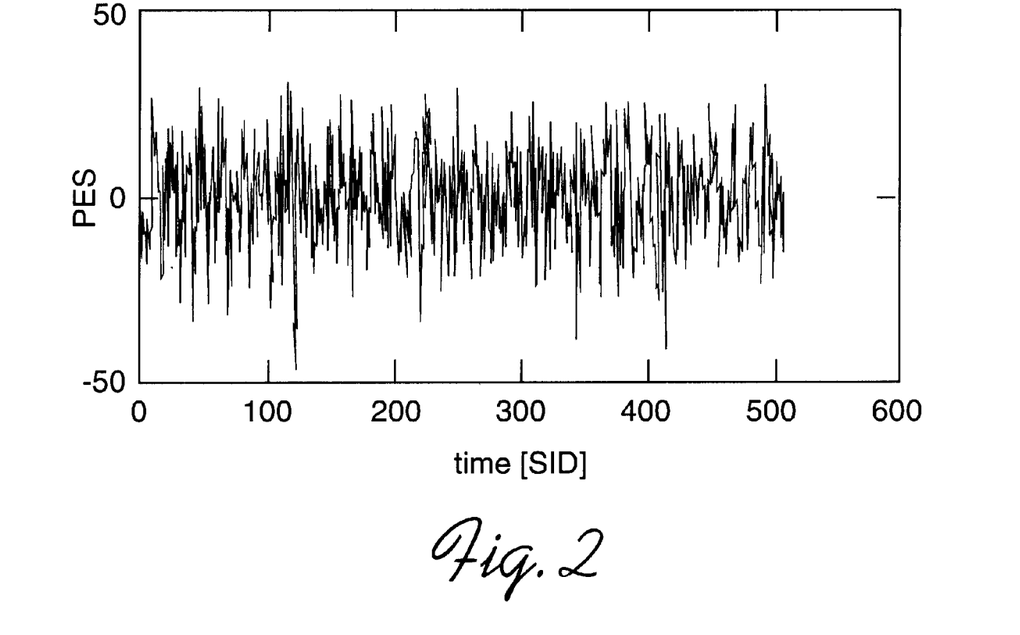
FIG. 2 illustrates an example of a PES signal, i.e., NRRO signal, as a function of time based on 511 samples.

FIG. 2 illustrates a measured position error signal (PES), which is an indication of the offset of the read head from the center of the track, as a function of time, i.e., the PES signal in the time domain. The data in FIG. 2 is determined from an array of 511 measured PESs. The PES values are plotted against the index value for the PES value in the array, i.e., which indicates the order (time) in which the PES value was measured. As discussed, in preferred embodiments, the PES is determined by the servo electronics 10 within the disk drive system 2. The PES is a measurement of the NRRO. In preferred embodiments, the measurement logic 14, which may be implemented within logic, e.g., processor 12, within the disk drive system 2 or within a separate stand-alone computer connected to the disk drive system 2, includes logic to perform a fourier transform on the measured PES data. Equation (2) below is implemented by the measurement logic 14 to perform a discrete fourier transform for samples of $NRRO_t$, measured by the servo electronics 10, at different times t, where t is the index value of a particular measured NRRO value in the array of NRRO values.

$$f_{NRRO}(k) = \sum_{t=0}^{N} NRRO_t \cdot \exp(-i \cdot k \cdot t) \tag{2}$$

Figure 3:
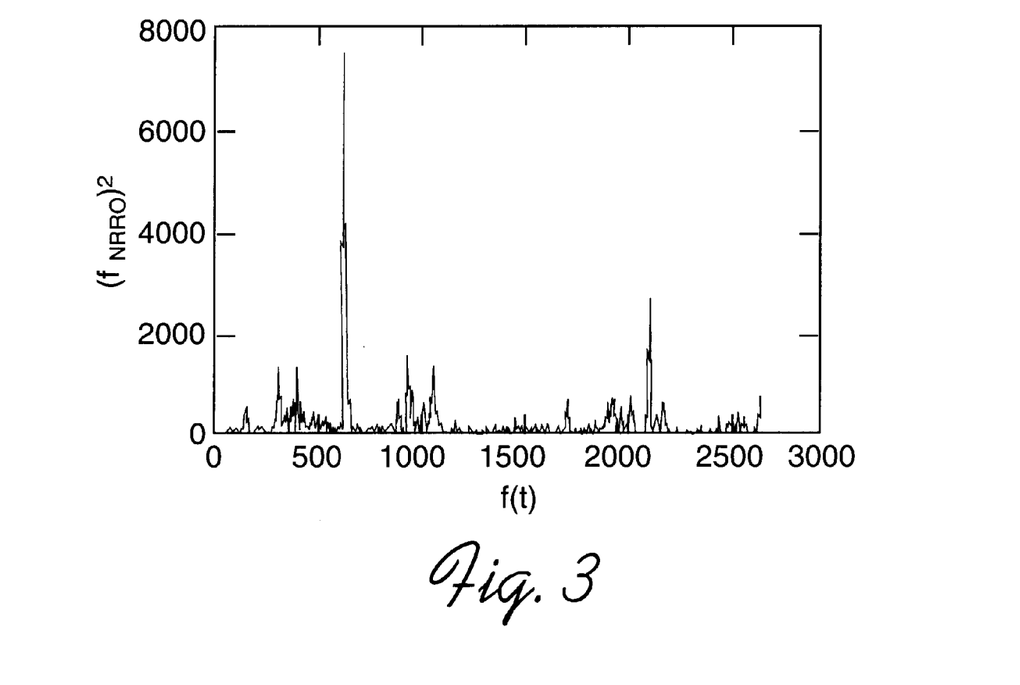
FIG. 3 illustrates an example of the NRRO power spectrum calculated by applying a discrete fourier transform to the NRRO samples illustrated in FIG. 2.

Thus, equation (2) measures the power spectrum at different frequencies k. In preferred embodiments, the sampling rate is based on the Nyquist frequency, such that the NRRO is not sampled at frequencies higher than the Nyquist frequency, which in the example of FIGS. 2 and 3 is 5400 Hz. Equation (3) illustrates the sampling frequencies used to calculate the fourier coefficients in equation (2), wherein Nyq is the Nyquist frequency and S is the number of samples. The frequency as a function of time is calculated with equation (3).

$$f(t) = \frac{(t \cdot Nyq)}{S} \quad (3)$$

Thus, the fourier coefficients determined from equation (2) are measured at different frequencies f(t) determined according to equation (3), by setting k to the frequency f(t) as calculated in equation (3). In calculating the fourier coefficients $f_{NRRO}(k)$ of the NRRO, the NRRO values are summed along all sampled data points in the array of NRRO values for t equals 0 through N, where N is the number of sampled points minus one.

Application of the fourier transform in equation (2), using k as defined in equation (3), produces the power spectrum illustrated in FIG. 3, of the squared fourier coefficients $(f_{NRRO})^2$ at different sampled frequencies f(t). In FIG. 3, the sampling frequency is a Nyquist frequency (Nyq) of 5400 Hz with a sample size (S) of 511. Thus, the fourier coefficients are calculated for each f(t) calculated for t values from 0 to 510, or 511 calculated fourier coefficients, one for each sample taken.

From the power spectrum in FIG. 3, the contribution of mechanical disturbances to the PES can be determined as such mechanical disturbances produce peaks in the power spectrum. Because mechanical vibrations occur at known mechanical frequencies, the noise contributed from such mechanical and other non-head related noise can be removed or filtered out by selecting a quiet region of the spectrum that does not include such mechanical frequencies. For instance, in the example of FIG. 3, the regions include mechanical noise are those regions outside of the frequency range of 1200–1800 Hz. The region excluding the mechanical frequencies is defined by an upper and lower bound of the frequency range excluding mechanical noise, i.e., the upper is 1800 Hz and the lower is 1200 Hz. The frequency of the upper (U) and lower bound (L) is known beforehand and is inherent in the design of the disk drive system 2. Thus, the upper (U) and lower (L) bound values would be maintained in the measurement logic 14 and based on inherent properties of the frequency of mechanical noise within the disk drive system 2.

A filter is thus applied to the power spectrum to determine the fourier coefficients within the region excluding mechanical noise, i.e., between L and U. After obtaining the fourier coefficients within this range, the fourier values can be folded back into the time domain by taking the inverse of the fourier coefficients within the range defined by the upper (U) and lower (L) bounds excluding mechanical noise. First the upper and lower frequency data points of the range are determined from equations (4) and (5) below, using the defined range upper (U) and lower (L) excluding mechanical noise $$\text{lower\_bound} = \frac{L \cdot S}{Nyq} \quad (4)$$

$$\text{upper\_bound} = \frac{U \cdot S}{Nyq} \quad (5)$$

The position error signal (PES) associated with MCS can then be determined by taking the inverse of the fourier coefficients within the frequency range excluding mechanical noise. Equation (6) below illustrates how the NRRO can be calculated from the fourier coefficients as a function of time t, i.e., NRRO(t) is in the time domain.

$$NRRO(t) = \sum_{j=\text{lower\_bound}}^{\text{upper\_bound}} f_{NRRO}(j) \cdot \exp(-i \cdot f_j \cdot t) \quad (6)$$

Equation (7) provides the filtered NRRO values which provide the NRRO for defects in the MR head, such as those caused by the magnetic affect of the write head, excluding noise from the mechanical frequencies.

Still further, the power of the noise excluding the mechanical factors can be calculated within the frequency range excluding mechanical noise as shown in equation (7) below, wherein $\overline{f_{NRRO}(i)}$ is the complex conjugate of the fourier coefficients $f_{NRRO}(i)$ at frequency i and may be calculated according to equation (6).

$$power = \sum_{i=\text{lower\_bound}}^{\text{upper\_bound}} f_{NRRO}(i) \cdot \overline{f_{NRRO}(i)} \quad (7)$$

This power value as calculated in equation (7) can then be used as the measurement of non-mechanical noise factors, due to head instability and file defects, which affect the magnetic properties of the head. Manufacturers may compare the calculated power of the MCS value for a disk drive with any predetermined thresholds to determine whether to accept or reject the given disk drive.

In further embodiments, the effect of the closed loop servo may be deconvolved by extracting the open loop disturbances from the measured closed loop TMR values. This would exclude the effect of the servo error rejection curve.

Figure 4:
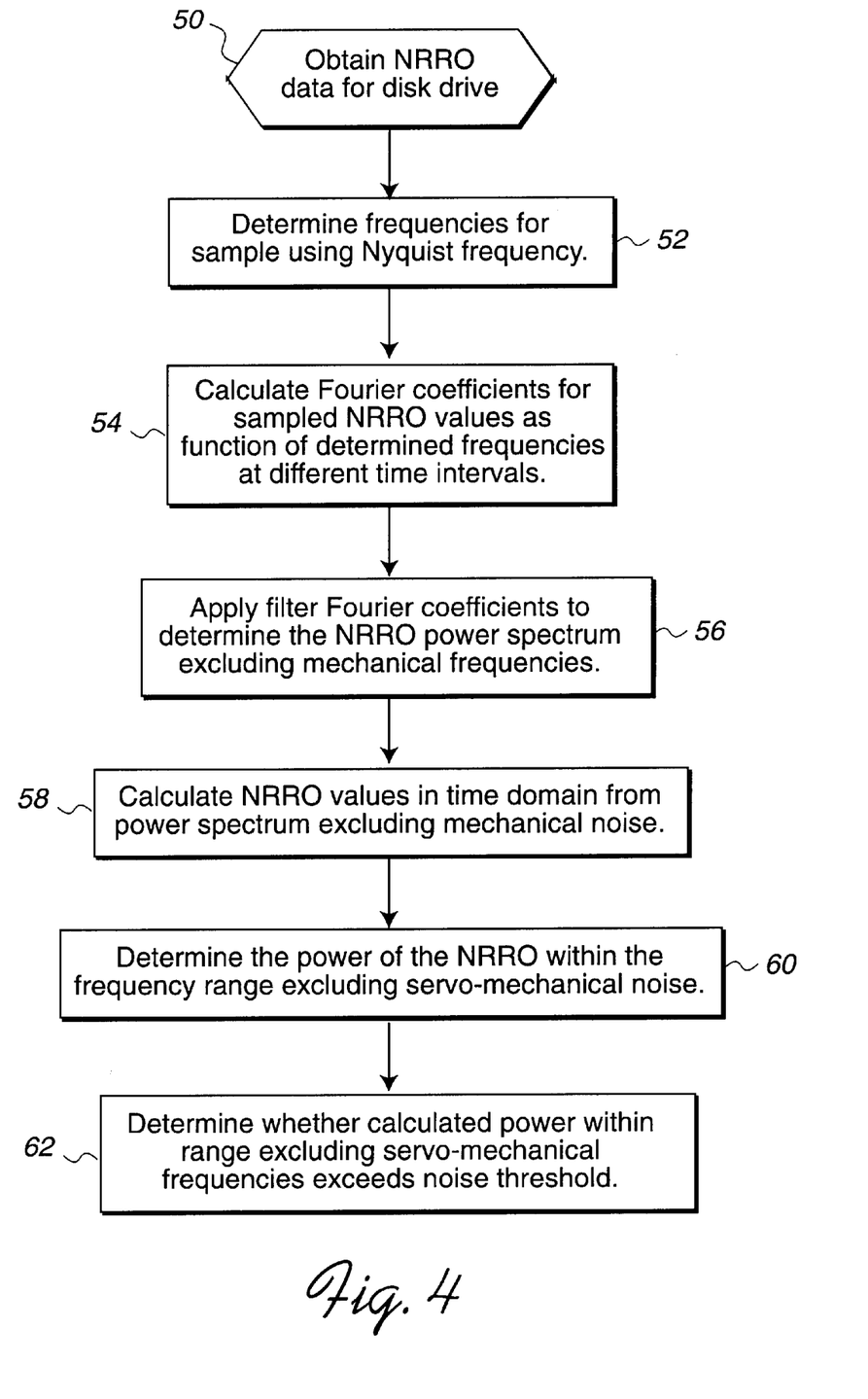
FIG. 4 illustrates logic to estimate the power of MCS noise in accordance with preferred embodiments of the present invention.

FIG. 4 illustrates logic implemented in the measurement logic 14, which, as discussed, may be embedded in the processor 12 of the disk drive system 2 to calculate a power value for the NRRO signals within a range that excludes mechanical noise. The process begins where the measurement logic 14 obtains (at block 50) samples of NRRO data from the servo electronics 10. The servo electronics 10 may store the sampled NRRO data on the disk 4 or return the NRRO data to the measurement logic 14 directly. The measurement logic 14 then determines (at block 52) frequencies, f(t), to use in a discrete fourier transform (DFT) to estimate the fourier coefficients, $f_{NRRO}(k)$, where k equals the calculated values of f(t), calculated according to equation (3) above for each value of t from 0 to 510. The measurement logic 14 calculates the fourier coefficients, $f_{NRRO}(k)$, from the sampled NRRO values for given samples, e.g., t=0–510, for each calculated k frequency, f(t), according to equation (2) set forth above. The measurement logic 14 then applies (at block 56) a filter to exclude mechanical noise from the calculated power spectrum of fourier coefficients. As discussed above, this filter may exclude measurements in the power spectrum outside a certain frequency range of known mechanical noise defined by the upper (U) and lower (L) bounds. Alternatively, other filters techniques known in the art, such as Hamming, Fe, etc., may be applied to the fourier coefficients to filter out mechanical noise.

The measurement logic 14 then calculates (at block 58) the NRRO(t) values in the time domain from the power spectrum of NRRO that excludes mechanical noise by taking the inverse of the filtered fourier coefficients. Such NRRO values result from the MCS. These NRRO values in the time domain may be calculated using the inverse fourier transform equation shown in equation (6) and using the upper and lower bounds calculated in equations (4) and (5), respectively. At block 60, the power of the NRRO signal within the range excluding mechanical noise is calculated. This power value of the NRRO excluding mechanical noise may be calculated using equation (7), which folds the calculated NRRO values in the time domain that do not include mechanical noise back into the NRRO fourier coefficients that also exclude mechanical noise. After calculating the power value of the NRRO indicating non-mechanical noise, the measurement logic 14 then compares (at block 62) this calculated power value against a predetermined threshold of acceptable non-mechanical noise, such as from defects and instability in the MR head. This predetermined threshold may be selected in a manner known in the art according to the reliability threshold the manufacturer wants to apply. For instance, for more expensive "high-end" disk drives, the manufacturer would select a lower power value as the threshold to tolerate less MCS; with more "low-end" drives, the manufacturer may tolerate a greater power value, or relatively greater MCS. If the calculated power value using equation (7) exceeds this predetermined threshold, then the disk drive from which the NRRO values were sampled may be rejected upon the grounds that non-mechanical noise is too high.

Preferred embodiments provide a method and system for estimating the magnetic center shift, excluding mechanical noises, after the disk drive is assembled. This allows the manufacturer to perform a test on the disk drive before shipping the drive to determine whether the manufacturer should reject the disk drive due to instability and defects in the MR head.

The preferred method and system may also be utilized by a user of the drive to calculate the magnetic center shift to diagnose any problems in the disk drive after purchase. If the logic of FIG. 4 is implemented within the disk drive, then the user may calculate on demand the filtered power value indicating the magnetic center shift from within the disk drive and stored in memory or on the disk. In this way, if the disk drive is experiencing problems, the user can determine whether problems are the result of excessive MCS, thereby indicating that the user should discard the drive. Alternatively, the logic of FIG. 4, may be executed whenever the user runs a diagnostic program from within the disk drive. For certain high-end disk drives, magnetic center shift can be calculated whenever the disk drive is initialized or comes on-line to make a determination of MCS and head instability with the drive system.

Further, the disk drive manufacturer may provide the user with a diagnostic disk including the logic of FIG. 4 to determine the magnetic center shift as part of a diagnostic routine run by the user. The diagnostic routine would alert the user of any high levels of magnetic center shift which could affect data reliability.

CONCLUSION

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize many modifications may be made to this configuration without departing from the scope of the present invention.

In preferred embodiments, the NRRO values were sampled using the servo electronics 10 within the disk drive system and the power value for non-mechanical noise was calculated using the logic of FIG. 4 implemented in measurement logic 14 external to the disk drive 2, such as a stand alone computer system. The logic of FIG. 4 may be implemented in a software program if the measurement logic 14 is in a computer external to the disk drive.

In alternative embodiments, the determination of the NRRO values as well as the power value using the logic described in FIG. 4 may be implemented within logic within the disk drive 2, including logic executed by the servo electronics 10 and processor 12. In such case, the logic of FIG. 4 to calculate the power value may be stored within a non-volatile memory unit within the disk drive 2 and/or the disk 4. Such a non-volatile memory unit may comprise a flash memory or other non-volatile memory known in the art. If the logic of FIG. 4 is maintained in a flash memory or the disk 4, then the logic may readily be configured and updated from an external source. The processor 12 and/or servo electronics 10 may store any determined data, including NRRO data, calculated fourier coefficients, frequencies, and other values in the disk 4 or some other memory device.

Preferred embodiments were described with respect to a discrete fourier transform, using a specific Nyquist frequency and upper and lower bound values to calculate the power value of non-mechanical noise. In further embodiments, modifications may be made to the specific equations and methods used to determine the power spectrum for non-mechanical noise related to defects in the MR head, particularly those defects that produce asymmetries in the read signal. Such modifications may include the use of different fourier equations, application of alternative windowing techniques, etc., to provide alternative techniques for estimating non-mechanical noise, or magnetic center shift.

In yet further embodiments, alternative spectral analysis techniques to those fourier transform techniques described herein may be used. Those skilled in the art will appreciate that alternative methods for spectral decomposition and transformation may be utilized. Such alternative spectral analysis techniques are described in "Methods of Mathematical Physics," Vols. I and II, by Richard Courant and D. Hilbert (John Wiley & Sons, January 1989), which publication is incorporated herein by reference in its entirety.

Preferred embodiments were described with respect to estimating noise from head instability with respect to MR heads. However, the preferred logic of FIG. 4 may be used with read and/or write heads other than MR heads, e.g., ferrite, MIG, thin film, GMR, one-sided, two-sided, etc., to determine non-mechanical noise arising from structural defects.

In summary, preferred embodiments disclose a system, method, and program for determining a value for non-mechanical noise within a disk drive system. The non-mechanical noise is likely related to instability in a head which reads data from a magnetic surface within the disk drive system. First, a sample of position error signals (PES) indicating non-repeatable runouts (NRRO) is provided from read operations within the disk drive system. Spectral analysis is then performed on the provided samples to calculate non-filtered power values for the NRRO values at different frequencies. A filtered power spectrum is determined within a frequency range excluding mechanical noise. A filtered power value is calculated from the determined filtered power spectrum within the frequency range excluding mechanical noise. The calculated filtered power value may be compared against a predetermined value to determine whether to reject the disk drive system on the grounds that there is too much non-mechanical noise or noise related to instabilities and defects in the MR head. The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for calculating a value for non-mechanical noise within a disk drive system related to magnetic effects on a head which reads data from a magnetic surface, comprising:

providing a sample of position error signals (PES) indicating non-repeatable runouts (NRRO) derived from read operations performed within the disk drive system;

performing spectral analysis on the provided samples to calculate power values for the NRRO values at different frequencies including a mechanical noise component;

calculating a power spectrum within a frequency range substantially excluding mechanical noise; and determining a power value from the calculated power spectrum within the frequency range substantially excluding mechanical noise.

2. The method of claim 1, further comprising comparing the determined filtered power value calculated from within the frequency range excluding mechanical noise against a predetermined value to determine whether to reject the disk drive system.

3. The method of claim 1, wherein the spectral analysis is determined within a range of frequencies sampled at a Nyquist rate.

4. The method of claim 3, wherein the frequencies used to perform the spectral analysis are a function of t, wherein the frequency f(t)=(t times the Nyquist frequency) divided by the number of NRRO samples.

5. The method of claim 1, wherein performing the spectral analysis comprises performing a fourier analysis.

6. The method of claim 5, wherein the fourier analysis comprises a discrete fourier analysis.

7. The method of claim 6, wherein the fourier analysis comprises calculating fourier coefficients ($f_{NRRO}$) as a function of frequency k, using the equation $$f_{NRRO}(k) = \sum_{t=0}^{N} NRRO_t \cdot \exp(-i \cdot k \cdot t),$$

where (N−1) is the number of sampled NRRO values.

8. The method of claim 7, wherein the frequency k is calculated using a Nyquist frequency as (t times the Nyquist frequency) divided by the number of NRRO samples.

9. The method of claim 7, wherein the filtered power value is determined by:

calculating the inverse of the fourier coefficients to determine the NRRO values that do not include mechanical noise; and calculating the filtered power value by summing a product of the inverse of the fourier coefficients and the fourier coefficients between a range of values.

10. The method of claim 9, wherein calculating the filtered power value further comprises:

determining an upper (U) and lower (L) bound of frequencies within the non-filtered power spectrum that do not include mechanical noise; and determining an upper data point as a function of the upper frequency and a lower data point as a function of the lower frequency, wherein the inverse is calculated from the fourier coefficients between the upper and lower data points, and wherein the filtered power value is calculated by summing the product of the fourier coefficients and the inverse values between the upper and lower data points.

11. The method of claim 1, wherein providing the sample of position error signals further comprises:

switching a write head on and off while performing the read operations from which the position error signals are derived.

12. The method of claim 1, wherein the determined power value includes non-mechanical noise factors.

13. The method of claim 12, wherein the non-mechanical noise factors include a magnetic center shift component.

14. A system for calculating a value for non-mechanical noise within a disk drive system related magnetic effects on a head which reads data from a magnetic surface, comprising:

means for providing a sample of position error signals (PES) indicating non-repeatable runouts (NRRO) from read operations performed within the disk drive system;

means for performing spectral analysis on the measured samples to calculate power values for the NRRO values at different frequencies including a mechanical noise component;

means for calculating a power spectrum within a frequency range substantially excluding mechanical noise; and means for determining a power value from the calculated power spectrum within the frequency range substantially excluding mechanical noise.

15. The system of claim 14, wherein the means for providing a sample of NRRO values comprises servo electronics within the disk drive system.

16. The system of claim 14, wherein the means for performing spectral analysis, calculating the filtered power spectrum, and determining the filtered and non-filtered power values is implemented in a computer system external to the disk drive.

17. The system of claim 15, wherein the means for performing spectral analysis, calculating the filtered power spectrum, and determining the non-filtered and filtered power values are implemented in electronic circuitry within the disk drive.

18. The system of claim 14, further comprising means for comparing the determined filtered power value calculated from within the frequency range excluding mechanical noise against a predetermined value to determine whether to reject the disk drive system.

19. The system of 14, wherein the means for performing the spectral analysis comprises performing a fourier analysis.

20. The system of claim 19, wherein the fourier analysis comprises calculating fourier coefficients ($f_{NRRO}$) as a function of frequency k, where the fourier coefficients ($f_{NRRO}$) are calculated as a function of frequency k, using the equation $$f_{NRRO}(k) = \sum_{t=0}^{N} NRRO_t \cdot \exp(-i \cdot k \cdot t),$$

where (N−1) is the number of sampled NRRO values.

21. The system of claim 20, wherein the means for determining the filtered power value comprises:
   means for calculating the inverse of the fourier coefficients to determine the NRRO values that do not include mechanical noise; and
   means for calculating the filtered power value by summing a product of the inverse of the fourier coefficients and the fourier coefficients between a range of values.

22. The method of claim 21, wherein the means for calculating the filtered power value further comprises:
   determining an upper (U) and lower (L) bound of frequencies within the non-filtered power that do not include mechanical noise; and
   determining an upper data point as a function of the upper frequency and a lower data point as a function of the lower frequency, wherein the inverse is calculated from the fourier coefficients between the upper and lower data points, and wherein the filtered power value is calculated by summing the product of the fourier coefficients and the inverse values between the upper and lower data points.

23. The system of claim 14, wherein the means for providing the sample of position error signals further performs:
   switching a write head on and off while performing the read operations from which the position error signals are derived.

24. The system of claim 14, wherein the determined power value includes non-mechanical noise factors.

25. The system of claim 24, wherein the non-mechanical noise factors include a magnetic center shift component.

26. An article of manufacture for use in calculating a value for non-mechanical noise within a disk drive system related to magnetic effects on a head which reads data from a magnetic surface, the article of manufacture comprising computer readable storage media including program logic embedded therein that causes control circuitry to perform the steps of:
   providing a sample of position error signals (PES) indicating non-repeatable runouts (NRRO) from read operations performed within the disk drive system;
   performing spectral analysis on the measured samples to calculate power values for the NRRO values at different frequencies including a mechanical noise component;
   calculating a power spectrum within a frequency range substantially excluding mechanical noise; and
   determining a power value from the calculated power spectrum within the frequency rage substantially excluding mechanical noise.

27. The article of manufacture of claim 26, further comprising comparing the determined filtered power value calculated from within the frequency range excluding mechanical noise against a predetermined value to determine whether to reject the disk drive system.

28. The article of manufacture of claim 26, wherein the spectral analysis is determined within a range of frequencies sampled at a Nyquist rate.

29. The article of manufacture of claim 28, wherein the frequencies used to perform the spectral analysis are a function of t, wherein the frequency f(t)=(t times the Nyquist frequency) divided by the number of NRRO samples.

30. The article of manufacture of claim 26, wherein performing the spectral analysis comprises performing a fourier analysis.

31. The article of manufacture of claim 30, wherein the fourier analysis comprises a discrete fourier analysis.

32. The article of manufacture of claim 31, wherein the fourier analysis comprises calculating fourier coefficients ($f_{NRRO}$) as a function of frequency k, using the equation $$f_{NRRO}(k) = \sum_{t=0}^{N} NRRO_t \cdot \exp(-i \cdot k \cdot t),$$

where (N−1) is the number of sampled NRRO values.

33. The article of manufacture of claim 32, wherein the frequency k is calculated using a Nyquist frequency as (t times the Nyquist frequency) divided by the number of NRRO samples.

34. The article of manufacture of claim 32, wherein the filtered power value is determined by:
   calculating the inverse of the fourier coefficients to determine the NRRO values that do not include mechanical noise; and
   calculating the filtered power value by summing a product of the inverse of the fourier coefficients and the fourier coefficients between a range of values.

35. The article of manufacture of claim 34, wherein calculating the filtered power value further comprises:
   determining an upper (U) and lower (L) bound of frequencies within the non-filtered power spectrum that do not include mechanical noise; and
   determining an upper data point as a function of the upper frequency and a lower data point as a function of the lower frequency, wherein the inverse is calculated from the fourier coefficients between the upper and lower data points, and wherein the power is calculated by summing the product of the fourier coefficients and the inverse values between the upper and lower data points.

36. The article of manufacture of claim 26, wherein providing the sample of position error signals further comprises:
   switching a write head on and off while performing the read operations from which the position error signals are derived.

37. The article of manufacture of claim 26, wherein the determined power value includes non-mechanical noise factors.

38. The article of manufacture of claim 37, wherein the non-mechanical noise factors include a magnetic center shift component.

* * * * *

UNITED STATES PATENT AND TRADEMARK OFFICE
CERTIFICATE OF CORRECTION

PATENT NO. : 6,522,495 B1
DATED : February 18, 2003
INVENTOR(S) : Lamberts et al.

It is certified that error appears in the above-identified patent and that said Letters Patent is hereby corrected as shown below:

Column 9,
Line 32, add -- filtered -- before "power".
Line 35, add -- filtered -- before each instance of "power".

Column 10,
Line 41 and lines 44-45, add -- filtered -- before "power".

Column 11,
Line 57, add -- filtered -- before "power".
Line 59, add -- filtered -- before each instance of "power".

Signed and Sealed this

Fifteenth Day of November, 2005

JON W. DUDAS
*Director of the United States Patent and Trademark Office*